United States Patent [19]
Miller et al.

[11] 3,712,571
[45] Jan. 23, 1973

[54] BASE MOUNTING

[75] Inventors: Eric Miller, Vaucluse; Robert Eric Miller, Rose Bay, both of Australia

[73] Assignee: R. E. Miller Pty., Limited, Rushcutters Bay, New South Wales, Australia

[22] Filed: Nov. 12, 1971

[21] Appl. No.: 198,384

[30] Foreign Application Priority Data

May 18, 1971   Australia..........................PA4916/71

[52] U.S. Cl..................................................248/183
[51] Int. Cl..............................................F16m 11/12
[58] Field of Search......248/179, 183, 184, 185, 186, 248/278, 291, 293

[56] References Cited

UNITED STATES PATENTS

| 2,434,829 | 1/1948 | Bentzman..............................248/183 |
| 2,882,001 | 4/1959 | Ries et al...............................248/183 |
| 3,552,700 | 1/1971 | Mitchell.............................248/205 R |
| 3,592,429 | 7/1971 | Miller et al..........................248/183 |

Primary Examiner—William H. Schultz
Attorney—Emory L. Groff et al.

[57] ABSTRACT

A base mounting for an instrument or machine which has to be panned and/or tilted, the mounting incorporating a lock mechanism comprising a plurality of balls acting on brake rods.

4 Claims, 3 Drawing Figures

BASE MOUNTING

This invention relates to a base mounting for an instrument or machine which has to be "panned" or "tilted" in the operation of aligning the instrument or machine with an object.

The pan and tilt functions of the above type of device are coupled with the requirements that such movements are effected with smoothness and with the facility of being able to arrest the movement, smoothly, quickly and effortlessly. This invention provides a base mounting, for instruments or machines, incorporating a quick acting and effortless braking system, for the moving parts thereof.

The invention provides a base mounting for an instrument or machine hereinafter called apparatus which has to be panned and/or tilted in the operation of aligning the apparatus with an object, the base mounting comprising a first member and a second member adapted to be secured to an apparatus and to support means respectively the first member being cylindrical and mounted for at least part rotary movement in a cylindrical bore in the second member and being restrained from axial movement relative to the second member, rotational movement braking means mounted in the first member, said braking means comprising a plurality of radial intersecting holes in the first member and an axial hole in the first member communicating with the radial holes, a control ball in the axial hole, power balls in the radial holes, means to move the control ball along the axial hole into engagement with the power balls, brake pads in the radial holes bearing at their first ends on the power balls and of such length that their other ends are simultaneously urged into contact with the cylindrical bore of the second member when said control ball is forced into contact with the power balls by the means for moving the control ball.

The braking system is capable of adaption to suit circumstances and two such adaptions as applied to a "-tilt" assembly of a combined pan and tilt mounting are hereinafter described with reference to the accompanying drawings in which.

Figure 1:
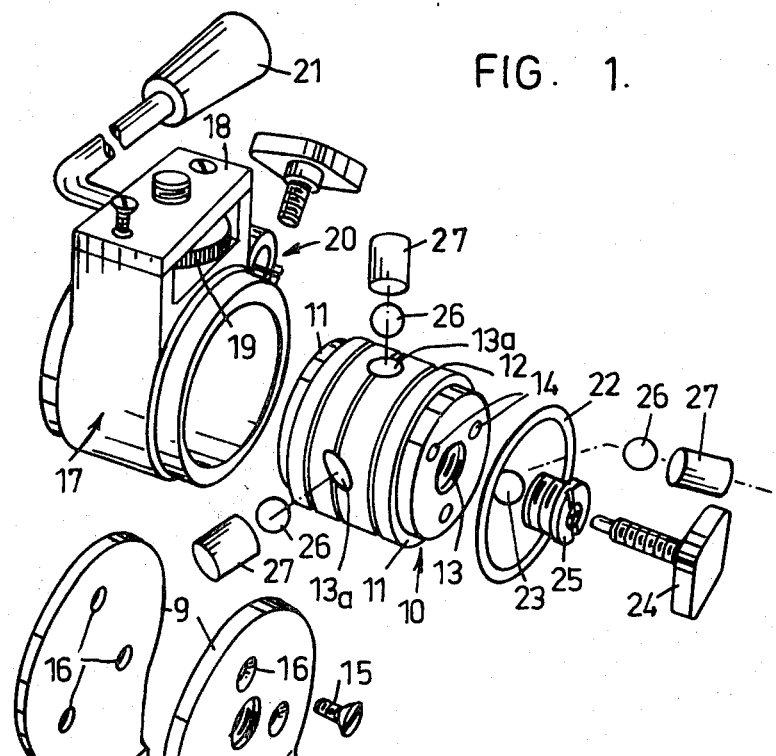
FIG. 1 is an exploded perspective view of one piece of equipment incorporating the invention.

Referring to FIG. 1 the equipment comprises a pan unit and a tilt unit. The pan unit includes a housing 1, a rotary piston 2 which is a sliding rotary fit in a recess 3 in the bottom of the housing 1, the piston is held in place by a lock ring 4 which is threaded onto the housing 1 and co-operated with a seal 5 to retain a lubricant for the piston 2 in the recess 3. Lubricant may be charged through plugged port 6 through the piston into the distribution grooves 7 in the piston. Threaded holes (not shown) in the piston 2 enable it to be secured to a stand e.g. a tripod. This arrangement permits panning of an instrument, e.g. a camera mounted on the equipment.

A simple screw operated brake shoe 8 is used to lock the piston 2 when required.

The body 1 has two upstanding wings 9 to receive the tilt unit comprised of a piston 10 stepped at its ends as at 11, peripherally grooved as at 12 to retain lubricant, axially bored for about half of its length as at 13 and radially drilled at three places as at 13a to intersect with the bore 13. The ends of the piston are drilled and tapped at three places as at 14 to receive screws 15 which pass through holes 16 in the wings 9 thereby securing the piston 10 to the wings 9. Rotatably mounted on the piston 10 is mounting sleeve 17 provided with a bridge portion 18 having a lock screw 19 captive therein so that a camera or the like can be removably mounted on the sleeve 17. A split clamp assembly indicated 20 secures a sleeve moving handle 21 in place.

The length of the sleeve 17 very closely approximates the distance between the wings 9 to provide minimum end clearance between the sleeve 17 and the wings 9.

Seals 22 are provided to maintain lubricant in the sleeve 17.

Figure 2:
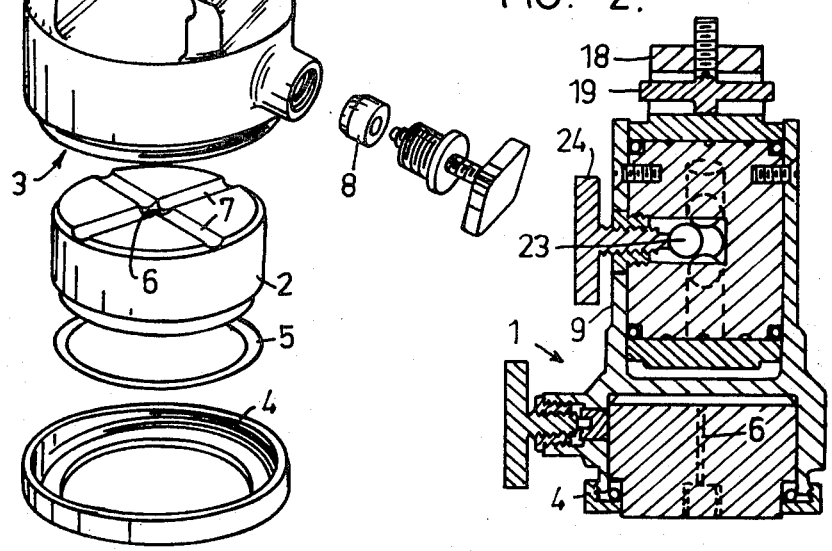
FIG. 2 is a sectional elevation of the equipment of FIG. 1 when assembled.

The braking system for the mounting sleeve 17 comprises a control ball 23 in the axial bore 13 of piston 10 movable by an actuator 24 right hand threaded into a tubular nut 25 in turn threaded into the bore 13. Three power balls 26 disposed in the three radial holes 13a engage the control ball 23 and three brake rods 27 in the holes 14 are made of such length that when the piston with its balls and rods are assembled in sleeve 17 the relationship is as shown in FIG. 2. It will be seen from FIG. 2 that clockwise rotation of actuator 24 will cause the control ball 23 to advance and urge power balls 26 radially outwardly thereby causing the rods 27 to bear at their outer ends on the bore of the sleeve 17 and exert a braking force to prevent or limit the rotation of the sleeve 17 relative to the piston 10, depending upon the force exerted by the actuator 24 on the control ball 23.

Figure 3:
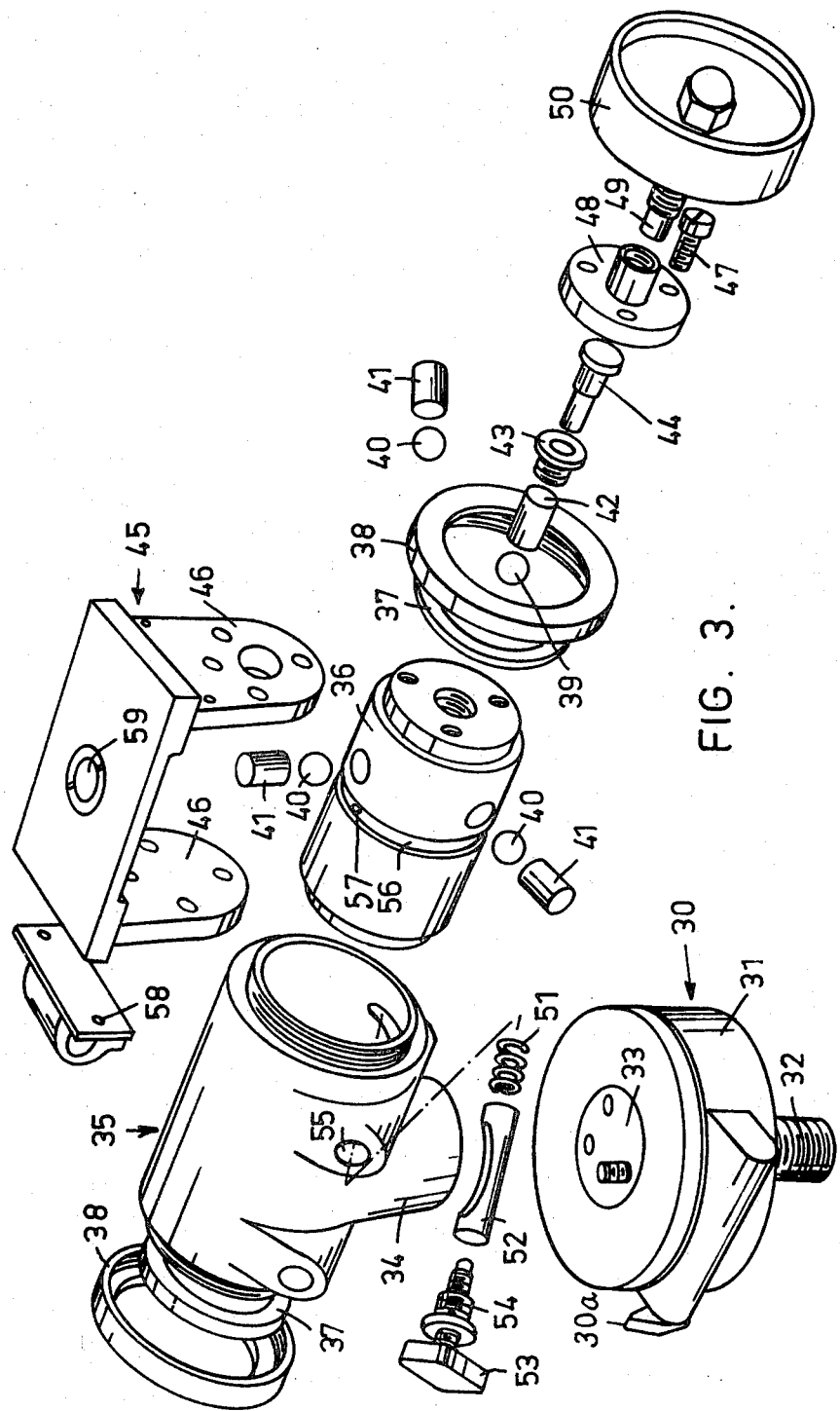
FIG. 3 is a view similar to FIG. 1 of a second piece of equipment incorporating the invention.

In FIG. 3 of the arrangement of parts, will be seen to be basically similar to those shown in FIG. 1. There is a pan unit 30 comprising a body 31 with a threaded spindle 32 whereby the pan unit can be mounted on a stand or tripod. A piston 33 is rotatably mounted in the body 31 and is adapted to be secured to a boss 34 on the sleeve 35. Thus the sleeve 35 will pan with the piston 33. Brake 30A is provided to regulate the movement of piston 33 in the body 31. A piston 36 is rotatably mounted in the sleeve 35 and is axially retained in the sleeve by seals 37 and end nuts 38. Axially and radially mounted in the piston 36 are control and power balls 39 and 40 respectively with associated brake rods 41. Mounted in the axial bore of the piston 36 is a slidable control rod 42 retained by threaded nut 43 and a pusher bar 44 slidable in the bore of the nut 43.

A U-shaped bridge 45 is secured by its legs 46 and screws 47 to the ends of the piston 36. The screws 47 also mount an actuator support 48 to one leg 46 of the bridge 45.

The actuator comprises a threaded spindle 49 mounted in the support 48 and a handle 50 on the spindle. It will be seen that when assembled rotation of handle 50 in one direction will advance spindle 49, pusher bar 44, control rod 42 and control ball 39. The power balls 40 are moved radially and brake rods 41 engage the bore of sleeve 35.

An additional braking device may be used to provide limited drag on the rotational movements of piston 36. Such a device is illustrated and comprises a spring 51, a contoured brake shoe 52 having a scooped portion corresponding very closely to the peripheral curvature of the piston 36 and a brake shoe activator comprising a threaded thumbscrew 53 mounted in a nut 54 threaded into the body at 55. It will be clear that a drag will be exerted on the piston 36 by the shoe 52 equal to the strength of the spring 51 when the thumbscrew is clear of the brake shoe 52. This pressure can be lessened and finally released by advancing the thumbscrew to centralize the brake shoe curvature with respect to the piston, the drag therebetween will thus be limited to the drag co-efficient of the lubricant with which the surfaces of the components are coated. In this regard it is to be noted that there is a peripheral oil groove 56 in the piston 36 coupled to an oil hole 57 communicating with the axial bore of the piston 36.

Also illustrated is an operator's handle clamp 58 which can be secured in any suitable manner to the other leg 46 of the bridge 45. A camera or like instrument securing element is notatably mounted in the bridge as at 59.

We claim:

1. A base mounting for an instrument or machine hereinafter called apparatus which has to be panned and/or tilted in the operation of aligning the apparatus with an object, the base mounting comprising a first member and a second member adapted to be secured to an apparatus and to support means respectively the first member being cylindrical and mounted for at least part rotary movement in a cylindrical bore in the second member and being restrained from axial movement relative to the second member, rotational movement braking means mounted in the first member, said braking means comprising a plurality of radial intersecting holes in the first member and an axial hole in the first member communicating with the radial holes, a control ball in the axial hole, power balls in the radial holes, means to move the control ball along the axial hole into engagement with the power balls, brake pads in the radial holes bearing at their first ends on the power balls and of such length that their other ends are simultaneously urged into contact with the cylindrical bore of the second member when said control ball is forced into contact with the power balls by means for moving the control ball.

2. A base mounting as claimed in claim 1 wherein the means for moving the control ball is a thumbscrew threadably mounted on the first member in alignment with said axial hole.

3. A base mounting as claimed in claim 1 wherein said first member is sealed in the second member in a fluid tight manner thereby permitting said cylinder to be charged with a lubricant.

4. A base mounting as claimed in claim 1 wherein the second member incorporates a cylinder in which there is rotatably mounted a piston adapted to be connected to a support, the rotational axis of the second piston being at right angles to the axis of rotation of the piston having the braking means.

* * * * *